United States Patent [19]

Andersson

[11] Patent Number: 4,543,076
[45] Date of Patent: Sep. 24, 1985

[54] UNIVERSAL JOINT

[75] Inventor: Henry Andersson, Saltsjö Boo, Sweden

[73] Assignee: Affarsverket FFV, Eskilstuna, Sweden

[21] Appl. No.: 548,293

[22] Filed: Nov. 3, 1983

[30] Foreign Application Priority Data

Nov. 5, 1982 [SE] Sweden .............................. 82 06290

[51] Int. Cl.[4] .............................................. F16D 3/22
[52] U.S. Cl. .................................................... 464/152
[58] Field of Search ............... 464/142, 139, 150, 151, 464/152, 111, 115, 905, 904; 403/74, 57

[56] References Cited

U.S. PATENT DOCUMENTS

| 265,550 | 10/1882 | Winger | 464/151 |
| 801,934 | 10/1905 | Toney | 464/151 |
| 1,677,311 | 7/1928 | Weiss | 464/142 |
| 2,254,972 | 9/1941 | Mollart et al. | 464/151 |
| 2,402,006 | 6/1946 | Anderson | 464/151 |
| 2,641,115 | 6/1953 | Garrison | 464/151 |
| 2,729,075 | 1/1956 | Cavanaugh | 464/151 |
| 2,921,451 | 1/1959 | Helmke | 464/904 |
| 2,923,141 | 2/1960 | Simonds | 464/905 |
| 2,954,685 | 10/1960 | Cuq | 464/151 |
| 4,205,539 | 6/1980 | Orain | 464/111 |

FOREIGN PATENT DOCUMENTS

| 875596 | 5/1953 | Fed. Rep. of Germany . |
| 946937 | 1/1964 | United Kingdom . |

Primary Examiner—Charles E. Phillips
Assistant Examiner—Leo J. Peters
Attorney, Agent, or Firm—McCormick, Paulding & Huber

[57] ABSTRACT

A Universal joint comprising two joint coupling parts (1, 2) adapted to transmit rotary torque at a universal angle position of the two joint coupling parts (1, 2) thereby each of the two joint coupling parts are formed with a torque like claw the arms (5) of which are axially rotated in relation to each other so as to engage each other over an intermediate coupling means comprising four coupling parts (9-12), which cooperate with the claw arms, and which by a predetermined force (17-20) are constantly pressed towards for from each other and to the sides of the claw arms (5) whereby any play depending on where is automatically eliminated.

11 Claims, 10 Drawing Figures

UNIVERSAL JOINT

The present invention generally relates to a universal joint of the type which is used for transmitting torque between two shafts or rotatable objects which at least from time to time may rotate or turn some angle in relation to each other. Universal joints of this type are generally used in machine structures, and many different types of such universal joints are previously known.

Many universal joints are of the cardon type and comprises two fork like coupling parts which over cross pins are connected to each other, and in which the said cross pins are mounted in each other over slide bearings or roller bearings. The said previously known universal joints often are expensive to manufacture, and after some time of use the bearings or the pins are worn, whereby plays appear in the joints.

Many universal joints are made completely of metal and give a butt metallic transmission of torque. In many cases such butt metallic contact may be advantageous, but in other cases there is a wish for a softer and more dampened contact.

For some specific purposes it is also a wish that the universal joint is formed so that the joint is broken up or collapses when the angle between the two joint shafts exceed a predetermined angle. One example of such field of use is for a wheel steering tube assembly for motor cars in which it is desired that the joint folds and is broken up in case of a car crash.

A main object of the invention has been to provide a universal joint of the above mentioned type which is simple and cheap to manufacture and which is broken up or caused to collapse when subjected to an angle exceeding a predetermined angle and in case of overload. Such a universal joint is known from the German Pat. No. 875,596 or the British Pat. No. 946,937 in which the universal joint comprises two fork like coupling parts which are interconnected over a intermediate ball like coupling means having two grooves in which the fork like coupling parts engage. A universal joint of this type can be simple and easy to manufacture, and if the intermediate ball like coupling means is made of some resilient material it may also give a non-metallic soft force transmittence between the two interconnected shafts for machine parts.

Like other previously known universal joints as mentioned above the universal joints of this type, however, are disadvantageous in that a wear of the coupling forks or of the imtermediate coupling means gives a unwanted play in the joint.

A specific object of the invention therefore has been to provide a universal joint which is simple and cheap to manufacture, which gives a non-metallic force transmittance between the two shafts or machine parts, which is designed so that only cheap parts are worn which makes a possible reconditioning of the joint simple and cheap and which above all is designed so as to automatically compensate for possible wear, so that no play appears in the joint.

According to the invention the intermediate coupling means of the universal joint is made of at least two co-operating parts which by a predetermined force are forced to the two forks or claws thereby automatically eliminating the appearance of any play or any play which otherwise should have been caused depending on wear.

Normally each fork or claw is formed with two cooperating arms and the two forks or claws are interconnected to be rotated 90° axially in relation to each other. It is, however, possible to form the forks or claws with more than two arms, for instance 3—3, 4—4 etc. For the sake of simplicity the invention will, however, be described only with reference to two-armed forks or claws according to non-limiting embodiments of the inventional idea.

Further characteristics of the invention will be evident from the following detailed specification in which reference will be made to the accompanying drawings.

In the drawings:

FIG. 1 shows a universal joint according to the invention, partly in an axial cross-section seen along line I—I of FIG. 2.

FIG. 2, in turn, shows a cross-section along line II—II of FIG. 1.

Figure 1:
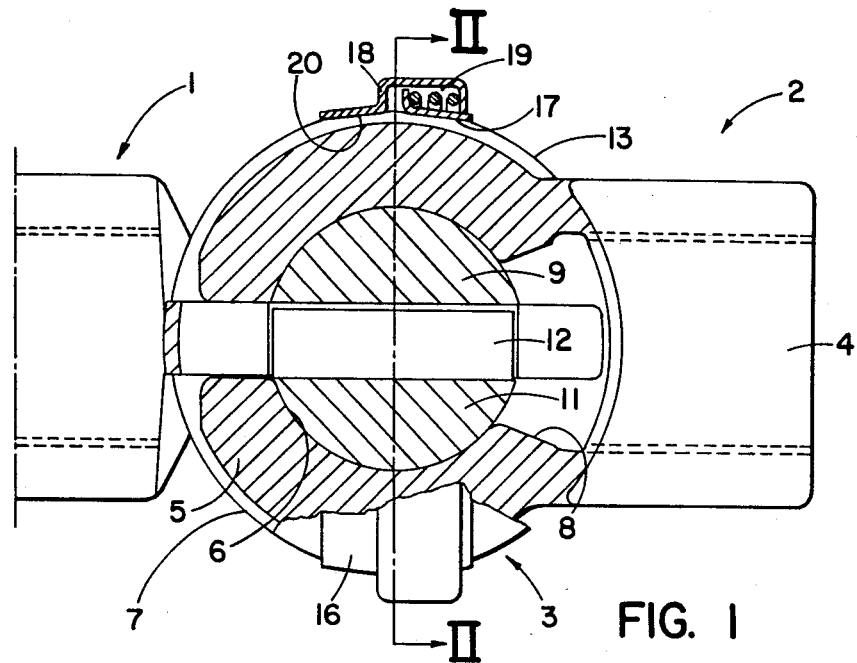
Figure 2:
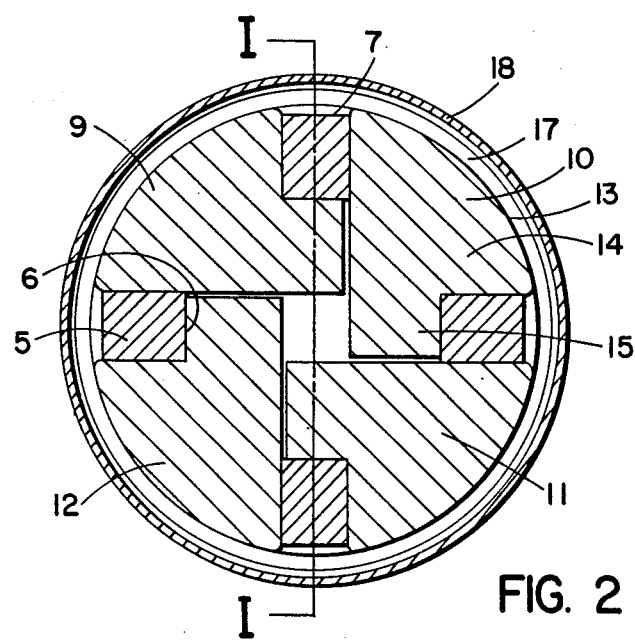

The universal joint shown in FIGS. 1-5 generally comprises two coupling claws 1 and 2 each intended to be connected to a shaft or a machine part, and an intermediate coupling means 3 for transmitting rotating torques in a universal angle position between the two coupling claws.

The coupling claws 1 and 2 preferably are identical and each comprises a supporing shaft hub 4 which may be threaded or formed with splines or wedge coupling grooves or similar means and from which two claws 5 extend. The claws are formed with an inner circular race 6 and a circular outer surface 7. The cooperating claws 5 extend over an angle of more than 180°, and in the illustrated embodiment the claws extend over an angle of about 300°-320°. Adjacent the shaft hub 4 each claw has a slotted portion 8, the purpose of which is to enable an extended rotation of the two coupling claws 1 and 2 in relation to each other. The slotted portion 8 should cover an angle which is at least twice as large as the largest angle over which the coupling claws 1 and 2 should be rotatable in relation to each other, and in the illustrated embodiment the slotted portion covers an angle of about 60°. As conventional the claws 5 are plane parallel and they are interconnected by means of the intermediate coupling means 3 in that each claw engages a groove of said intermediate coupling means.

The intermediate coupling means is composed of four coupling parts 9-12 which together provides a ball like body having an outer periphery 13 which is larger than the outer periphery 7 of the coupling claws 5 for a purpose which will be explained in the following.

Each coupling parts 9–12 generally provides a ball quadrant having a head portion 14 and a foot portion 15. The foot portion 15 is slightly less wide than the claws 5 and is formed as a half circle engaging the inner circular race of each respective claw. As best evident from FIG. 2 the coupling quadrants 9–12 are combined so that each quadrant is embraced of a claw in the pair of claws. For keeping the different parts of the universal joint together and for compensating for possible play the joint has an enclosing adjustment mechanism comprising an inner sweep ring 17 and outer sweep ring 18 and an intermediate spring 19. The outer periphery of the coupling quadrants 9–12 are designed with an angular surface having the angle tip in the great circle of the ball. Each one of the inner sweep ring 17 and the outer sweep ring 18 may be freely mounted on one half of the angle surface 20, but the inner sweep and/or the outer sweep alternatively may be fixed mounted on one side of the angle surface 20. The pressure spring 19 acts between a radially outwards directed flange of the inner sweep ring 17 and a radially inwards directed flange of the outer sweep ring 18 and tends to press the two sweep rings 17 and 18 to each other. At the same time the pressure spring 19 thereby is forcing the quadrants 9–12 radially inwards and to engagements with the sides of the claws 5. Thanks to the play between the head part 14 of one quadrant and the foot part 15 of the adjacent quadrant, the quadrants may be at least slightly warned without the appearance of any free play between the coupling parts.

Figure 3:
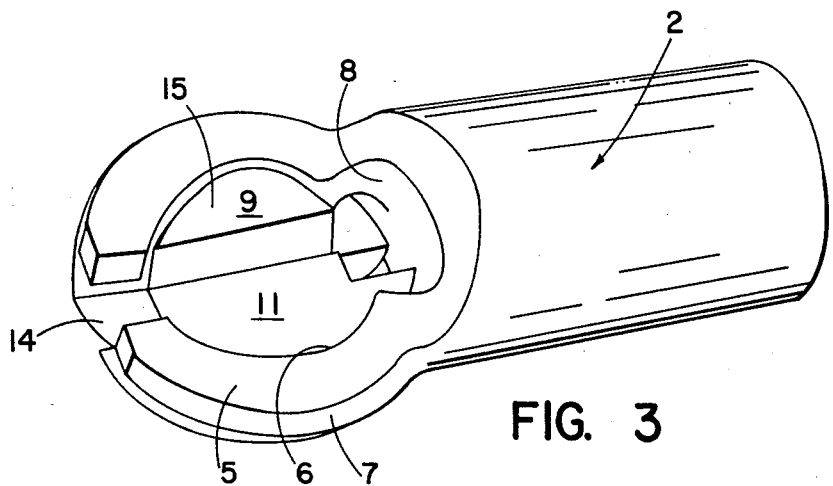
FIGS. 3 and 4 are perspective views of the coupling claws or coupling forks of the universal joint shown together with some parts of the intermediate coupling means and shown in two different perspective views.
Figure 4:
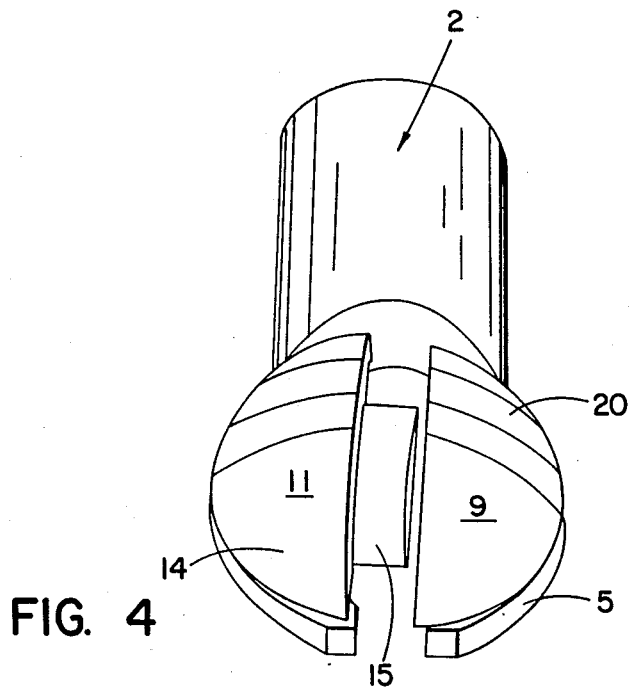
Figure 5:
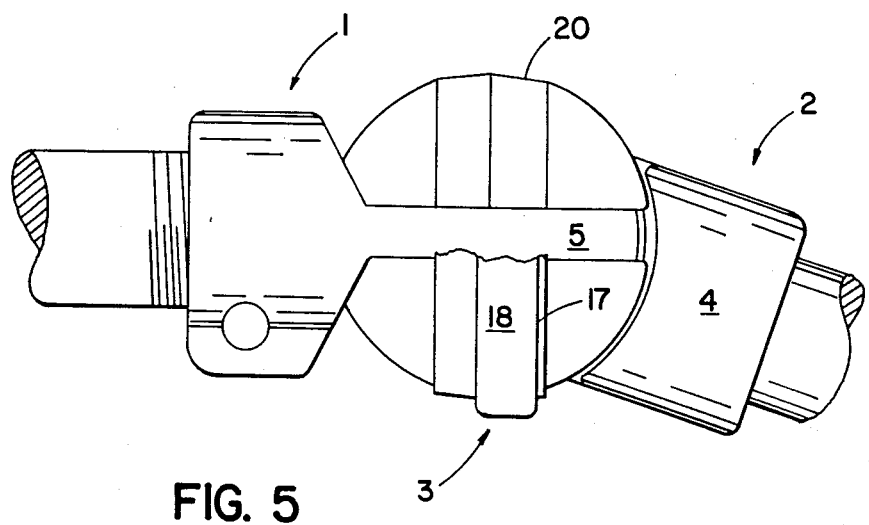
FIG. 5 is a partly broken up view of the universal joint of FIGS. 1-4 in an angled coupled position.
Figure 6:
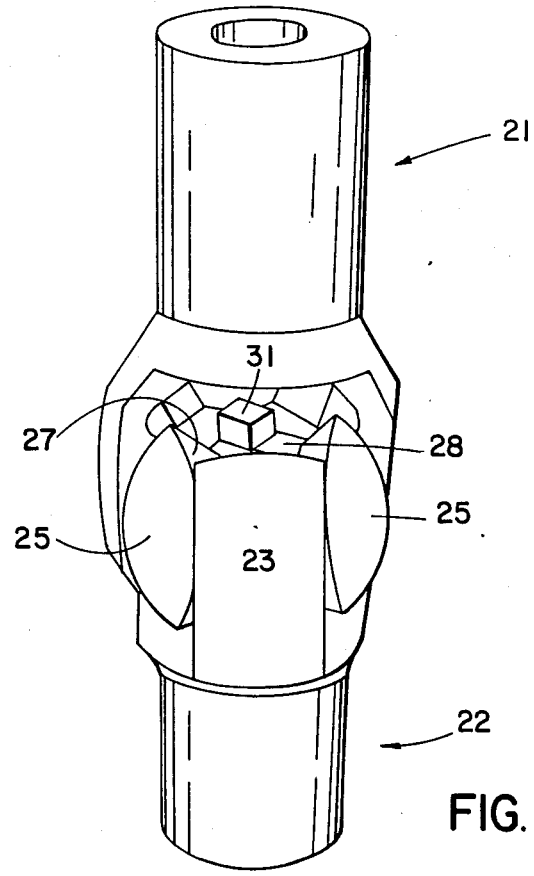
FIG. 6 is a perspective view of an alternative embodiment of a universal joint according to the invention.
Figure 7:
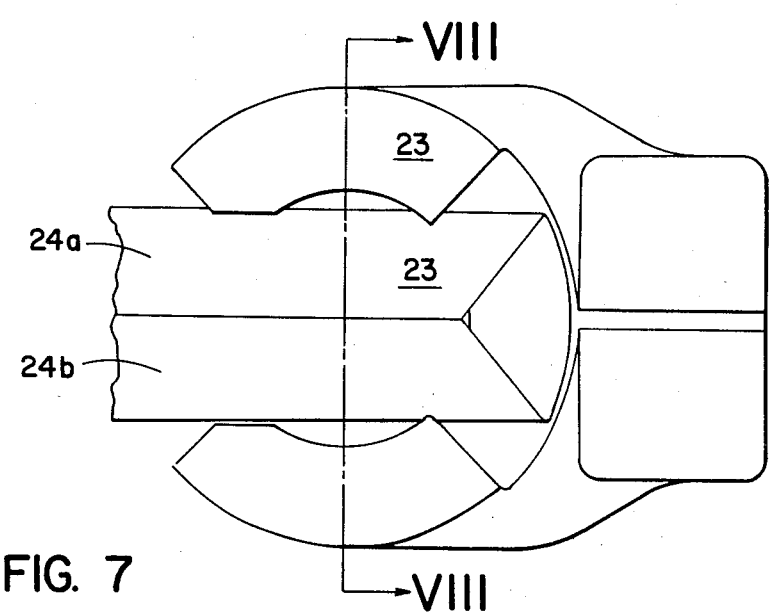
FIG. 7 is a partly diagrammatic and broken up view of the coupling claws of the joint according to FIG. 6.
Figure 8:
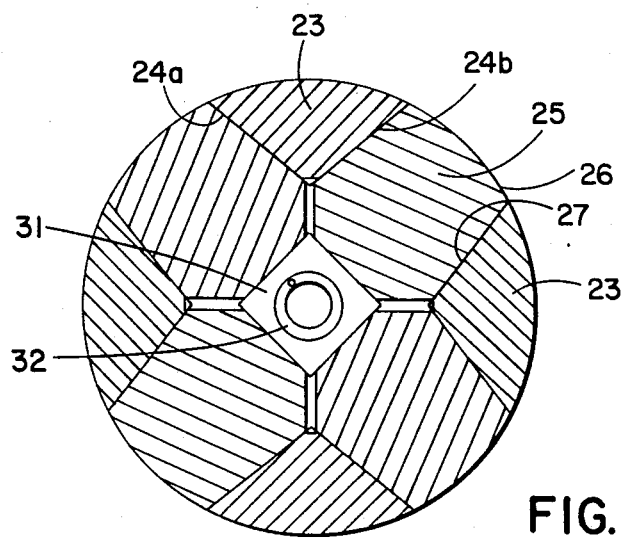
FIG. 8 is a cross section along line VIII—VIII of FIG. 7.

FIGS. 3 and 4 are two different perspective views of one of the two coupling claws 2 together with two coupling quadrants 9 and 11. FIG. 5 shows a slightly modified embodiment of the coupling according to FIGS. 1–4 in an angle drive position.

FIGS. 6–10 show a modified embodiment of the invention, which basically differs from the embodiment of FIGS. 1–5 in that the adjustment mechanism in the latter case is provided internally whereas the adjustment mechanism in the previously described embodiment is provided externally. Also in this case the apparatus comprises two coupling claws 21 and 22 each having two claws or arms 23. The arms 23 likewise provide an inner circular arc race 24. The inner circular arc race 24 is angled and encloses an angle which is larger than 90° for retaining the inner coupling means. In this case the inner coupling means comprises for insert parts 25 having a bow formed outer surface 26 and sides 27 which diverge radially inwards so that the sides 27 engage the angle sides 24a and 24b of the arm arc surface 24. Thanks to the above described angles the insert parts 25 are retained in the space between the two coupling claw arms 23.

Figure 9:
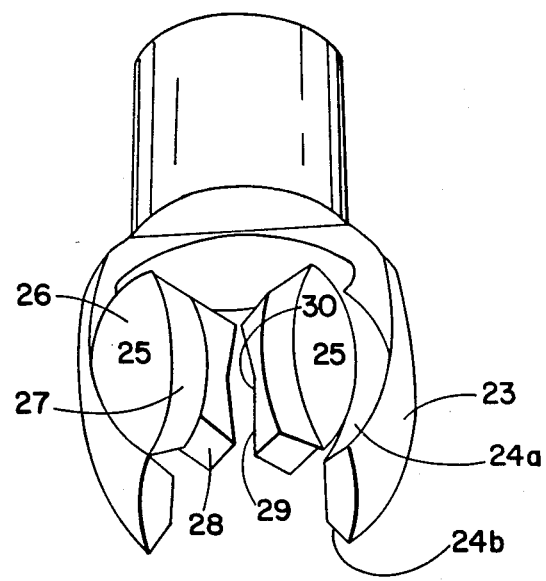
FIG. 9 is a perspective diagrammatic view of a coupling claw together with two intermediate coupling mean parts in a joint according to FIGS. 6-8, FIG. 10 diagrammatically illustrates the automatically operating play-free-adjustment means of the joint according to FIG. 6-9.
Figure 10:
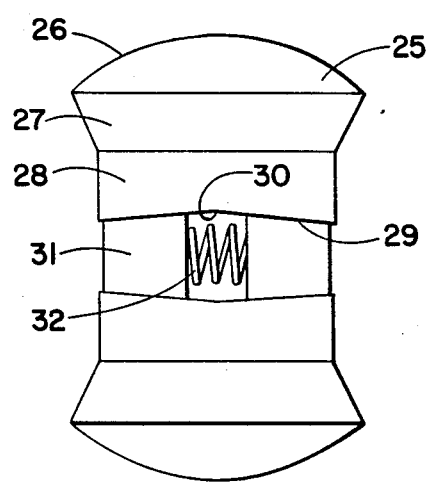

For providing an automatical adjustment of possible wear each insert part is formed with an inner foot 28, as best evident from FIGS. 9 and 10. The inner surface 29 of the inner foot 28 is slightly angled radially outwards with the apex 30 intermediate the foot 28 and the angle surface 29 extending in the longitudinal direction of the insert part. Between two cooperating insert parts there is an adjustment mechanism comprising two wedge parts 31 and an intermediate pressure spring 32 which is forcing the wedge parts 31 apart and thereby is forcing the cooperating insert part 25 radially outwards from each other. In case of wear the insert parts 25 therefore successively are being pressed radially outwards so as to constantly be in contact with the sides 24a and 25b of the claw arms 23.

In this connection it may be noted that an equivalent function may be obtained without the use of the above described wedge part and the intermediate pressure spring, viz. in such universal joints which are intended to rotate at relatively high speed. In such joints the intermediate parts alone may provide the automatical adjustment by the action of the centrifugal force. Possibly the insert parts in this case may be made of a more heavy material or having a heavy insert portion.

As obvious to the expert a further equivalent function may be obtained in that the wedge parts together with the intermediate spring is substituted by a resilient insert, for instance a body of nature rubber or synthetic rubber.

Preferably the coupling claws including the arms are made of a hard and wear resistent material, whereas the intermediate parts can be made of a less hard material like a suitable resin, for instance a self-lubricating synthetic resin. The force transmittence between the two coupling claws thereby is made by a damped non-metallic contact. Possible wear appears in the intermediate coupling parts made of the relatively cheap material, and thereby the universal joint may easily and non-expensively be re-conditioned. Depending on the special design the joint is broken up or collapses if the joint shafts are angled over a predetermined angle or if the joint is overloaded. This may be advantageous or even necessary if the universal joint is used as a coupling for a steering wheel tube for a similar purpose.

For protecting the universal joint and preventing wear depending on external substances like dust, sand, gravel etc. entering the joint it may as usual be formed with protection cover provided over the joint and sealingly engaging the shaft hubs of the coupling claws.

It is to be understood that the above specification and the embodiments of the invention shown in the drawings are only illustrating examples and that all kinds of modifications may be presented within the scope of the appended claims.

I claim:

1. Universal joint comprising two joint coupling members (1, 2; 21, 22) and intermediate coupling means for connecting the two coupling members to transmit rotary torque at a universal angle position between the two coupling members (1, 2; 21, 22), each of the two coupling members having a fork like claw (5; 23), the two claws which comprise the coupling members being axially rotatable in relation to each other to such angle as to engage each other over the intermediate coupling means (3; 25), characterized in that the intermediate coupling means comprises at least four separate coupling parts (9–12; 25), and biasing means (19, 32) for urging the coupling parts (9–12; 25) towards the two claws to automatically eliminate play within the joint resulting from wear.

2. Universal joint according to claim 1, characterized in that the four coupling parts comprise quadrants (9–12) which in combination are substantially ball-shaped and have an outer dimeter larger than the circumscribing diameter of the claws, and in that the biasing means comprises an external wedge joint (17–20) which forces the coupling quadrants (9–12) radially towards each other and towards the claws (5).

3. Universal joint according to claim 2, characterized in that each coupling quadrant (9–12) is formed with a head part (14) providing the outer periphery of the quadrant and a foot part (15) engaging an inner circular arc race (6) of a claw (5), and each claw (5) includes at least one pair of arms which extend over an angle of more than 180.

4. Universal joint according to claim 2, characterized in that the coupling quadrants (9–12) externally are formed with an angle surface (20) having the apex thereof in the great circle of the coupling quadrants, and the wedge joint (17–19) includes an inner sweep ring (17) engaging one side of the angle surface, an outer sweep ring (18) engaging the opposite side of the angle surface, and an intermediate pressure spring (19) urging the inner sweep ring and the outer sweep ring towards each other and toward the apex to force the coupling quadrants radially inwards towards each other and towards the sides of the coupling claw arms (5).

5. Universal joint according to claim 1, characterized in that each claw has arms (23) arc formed and angle formed with the arc apex facing radially inwards and extending over an angle of more than 90, and in that the coupling parts comprise insert parts (25) provided between each respective pairs of coupling claw arms and adapted to be pressed radially outward to the said angle sides.

6. Universal joint according to claim 5, characterized in that each insert part (25) is arc formed and has a head, the sides of which converge in the direction radially outwards and engage the angle sides (24a, 25b) of the coupling claw arms (23) and a foot part (28) which forces the insert parts radially outwards into constant contact with the angle sides of the coupling claw arms (23) by the action of a biasing means which is in common for all insert parts.

7. Universal joint according to claim 6, characterized in that the foot portion (28) of each insert part (25) is formed with a radially inwards directed wedge coupling surface (29), and in that the biasing means comprises a spring biassing wedge means (31, 32) forcing all insert parts (25) radially outwards.

8. Universal joint according to claim 7, characterized in that the innermost surface of the foot portion (28) of each insert part (25) as seen in the radial direction, in angled (29) with the angle apex centrally on the foot portion (28) as seen in the longitudinal direction of the insert part, and in that the spring biassing wedge means comprises two wedge parts (31) and an intermediate pressure spring (32) provided centrally inside the universal joint and adapted to force the insert parts radially outwards into contact with the angle surfaces (24a, 25b) by acting on the angle surfaces (29) of the intermediate part feet (28).

9. Universal joint according to claim 3, characterized in that the coupling quadrants (9–12) externally are formed with an angle surface (20) having the apex thereof in the great circle of the coupling quadrants, and whereby the angle surface (20) cooperates with the spring operating wedge means (17–19), which includes an inner sweep ring (17) engaging one angle side and an outer sweep ring (18) engaging the opposite angle side and an intermediate pressure spring (19) tends to move the inner sweep ring and the outer sweep ring towards each other thereby forcing the coupling quadrants radially inwards towards each other and towards the sides of the coupling claw arms (5).

10. Universal joint comprising two joint coupling members (1, 2; 21, 22) and intermediate coupling means (3; 25) for transmitting rotary torque at a universal angle position between the two coupling members (1, 2; 21, 22), each of the two coupling members (1, 2; 21, 22) having a fork like claw (5, 23), the claws being rotatable relative to each other about the intermediate coupling means and to an angular position wherein the claws engage each other, and characterized by each pair of claws extending over an angle of more than 180 and said intermediate coupling means (3) including four coupling quadrants (9–12) which in combination are substantially ball-shaped and have an outer diameter larger than the circumscribing diameter of the claws, each of the coupling quadrants (9–12) having a head part defining the outer periphery of the quadrant and a foot part engaging an inner circular arc race (6) of the claw (5) and the foot part of each coupling quadrant has a width slightly less than the width of a cooperating claw to provide slight wear compensating play between the head part and the foot of the adjacent coupling quadrant, and biasing means for urging said quadrants toward said claws.

11. Universal joint according to claim 10, characterized in that the coupling quadrants (9–12) externally are formed with an angle surface (20) having the apex thereof in the great circle of the coupling quadrants, and whereby the angle surface (20) cooperates with the spring operating wedge means (17–19), which includes an inner sweep ring (17) engaging one angle side and an outer sweep ring (18) engaging the opposite angle side and an intermediate pressure spring (19), tends to move the inner sweep ring and the outer sweep ring towards each other thereby forcing the coupling quadrants radially inwards towards each other and towards the sides of the coupling claw arms (5).

* * * * *